United States Patent
Ofstad et al.

(10) Patent No.: US 9,202,307 B2
(45) Date of Patent: Dec. 1, 2015

(54) BROWSING IMAGES OF A POINT OF INTEREST WITHIN AN IMAGE GRAPH

(71) Applicant: Google Inc., Mountain View, CA (US)

(72) Inventors: Andrew Ofstad, San Francisco, CA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 14/236,320

(22) PCT Filed: Jul. 16, 2013

(86) PCT No.: PCT/US2013/050752
§ 371 (c)(1),
(2) Date: Jan. 30, 2014

(87) PCT Pub. No.: WO2014/025502
PCT Pub. Date: Feb. 13, 2014

(65) Prior Publication Data
US 2015/0154793 A1 Jun. 4, 2015

Related U.S. Application Data

(60) Provisional application No. 61/681,095, filed on Aug. 8, 2012.

(51) Int. Cl.
*G09G 5/00* (2006.01)
*G06T 15/20* (2011.01)
(Continued)

(52) U.S. Cl.
CPC ............ *G06T 15/205* (2013.01); *G06F 3/0481* (2013.01); *G06T 19/003* (2013.01); *G06T 2207/20101* (2013.01); *G06T 2207/20108* (2013.01); *G06T 2219/028* (2013.01)

(58) Field of Classification Search
None
See application file for complete search history.

(56) References Cited

U.S. PATENT DOCUMENTS

| 7,712,052 B2 | 5/2010 | Szeliski et al. |
| 2007/0078846 A1 | 4/2007 | Gulli et al. |

(Continued)

FOREIGN PATENT DOCUMENTS

KR 10-2002-0037113 5/2002

OTHER PUBLICATIONS

Noah Snavely, Steven M. Seitz, and Richard Szeliski. 2006. Photo tourism: exploring photo collections in 3D. In ACM SIGGRAPH 2006 Papers (SIGGRAPH '06). ACM, New York, NY, USA, 835-846. DOI=10.1145/1179352.1141964 http://doi.acm.org/10.1145/1179352.1141964.*

(Continued)

*Primary Examiner* — Phi Hoang
(74) *Attorney, Agent, or Firm* — Lerner, David, Littenberg, Krumholz & Mentlik, LLP

(57) ABSTRACT

Systems and methods for browsing images of points of interest (POIs) are provided. Indication of selection of POI from among multiple POIs is received. Image graph associated with POI is identified. Image graph includes multiple images of POI. Tour path for POI is defined within image graph. Specific image from tour path defined within image graph is provided for display. Previous image and next image relative to specific image along tour path defined within image graph are determined. First set of additional images from image graph based on specific image is determined. First set of additional images corresponds to set of images in image graph proximate to specific image. Link to previous image or next image, and link to each member of first set of additional images for display with specific image are provided.

20 Claims, 9 Drawing Sheets

(51) Int. Cl.
*G06F 3/0481* (2013.01)
*G06T 19/00* (2011.01)

(56) References Cited

U.S. PATENT DOCUMENTS

| | | | |
|---|---|---|---|
| 2008/0028341 A1* | 1/2008 | Szeliski et al. | 715/854 |
| 2008/0195692 A1* | 8/2008 | Hayosh et al. | 709/202 |
| 2009/0115785 A1 | 5/2009 | Grandhi et al. | |
| 2010/0169838 A1 | 7/2010 | Szeliski et al. | |
| 2010/0290699 A1 | 11/2010 | Adam et al. | |
| 2011/0153590 A1* | 6/2011 | Chang et al. | 707/711 |
| 2011/0214072 A1* | 9/2011 | Lindemann et al. | 715/757 |
| 2012/0093411 A1 | 4/2012 | Tang et al. | |
| 2012/0124471 A1* | 5/2012 | Gusky et al. | 715/705 |

OTHER PUBLICATIONS

Snavely, "Finding Paths through the World's Photos", retrieved on Aug. 28, 2012 from <http://phototour.cs.washington.edu/findingpaths/>.

Snavely et al., "Finding Paths through the World's Photos", ACM Transactions on Graphics, SIGGRAPH, 2008.

"Bundler: Structure from Motion (SfM) for Unordered Image Collections", Apr. 25, 2010, retrieved <http://phototour.cs.washington.edu/bundler/>.

* cited by examiner

BROWSING IMAGES OF A POINT OF INTEREST WITHIN AN IMAGE GRAPH

CROSS-REFERENCE TO RELATED APPLICATIONS

The present application is a national stage application of International Application No. PCT/US2013/050752, entitled "BROWSING IMAGES OF A POINT OF INTEREST WITHIN AN IMAGE GRAPH" and filed on Jul. 16, 2013, which claims priority to U.S. Provisional Pat. Application Ser. No. 61/681,095, entitled "BROWSING IMAGES OF A POINT OF INTEREST WITHIN AN IMAGE GRAPH" and filed on Aug. 8, 2012, the entire contents of each of which are incorporated by reference herein for all purposes.

BACKGROUND

The subject technology generally relates to visual data processing.

Some Internet-based mapping services may include images of points of interest (e.g., the Statue of Liberty) arranged in an image graph based on the viewpoint position, viewpoint orientation, and field of view of the image. However, the images in these mapping services may be difficult to navigate because the user may not know the structure of the image graph and may attempt to navigate to a portion of the graph where no images are available or accidentally navigate away from the point of interest. As the foregoing illustrates, a new approach for browsing images of a point of interest within an image graph may be desirable.

SUMMARY

The disclosed subject matter relates to a computer-implemented method for browsing images of points of interest. The method includes receiving an indication of a selection of a point of interest from among a plurality of points of interest. The method also includes identifying an image graph associated with the selected point of interest. The image graph includes a plurality of images of the selected point of interest. A tour path for the selected point of interest is defined within the image graph. The method also includes providing a specific image from the tour path defined within the image graph for display. The method also includes determining a previous image and a next image relative to the specific image along the tour path defined within the image graph. The method also includes determining a first set of additional images from the image graph based on the specific image. The first set of additional images corresponds to a set of images in the image graph proximate to the specific image. The method also includes providing a link to the previous image or the next image, and a link to each member of the first set of additional images for display with the specific image.

The disclosed subject matter further relates to a computer-readable medium. The computer-readable medium includes instructions that, when executed by a computer, cause the computer to implement a method for browsing images of a point of interest selected by a user. The instructions include code for identifying an image graph associated with the selected point of interest. The image graph includes a plurality of images of the selected point of interest. A tour path for the selected point of interest is defined within the image graph. The instructions also include code for providing a specific image from the tour path defined within the image graph for display. The instructions also include code for determining a previous image and a next image relative to the specific image along the tour path defined within the image graph. The instructions also include code for determining a first set of additional images from the image graph based on the specific image. The first set of additional images corresponds to a set of images in the image graph proximate to the specific image. The instructions also include code for providing a link to the previous image or the next image, and a link to each member of the first set of additional images for display with the specific image.

The disclosed subject matter further relates to a system. The system includes one or more processors. The system also includes a memory. The memory includes instructions which, when executed by the one or more processors, cause the one or more processors to implement a method for browsing images of points of interest. The instructions include code for receiving an indication of a selection of a point of interest from among a plurality of points of interest. The instructions also include code for identifying a tour path associated with the selected point of interest. The tour path includes a plurality of images of the selected point of interest arranged according to an order. The instructions also include code for providing a specific image from the tour path defined within the image graph for display. The instructions also include code for determining a previous image and a next image relative to the specific image along the tour path. The instructions also include code for determining a set of additional images based on the specific image. The set of additional images includes one or more images not included in the tour path. The instructions also include code for providing a link to the previous image or the next image, and a link to each member of the set of additional images for display with the specific image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
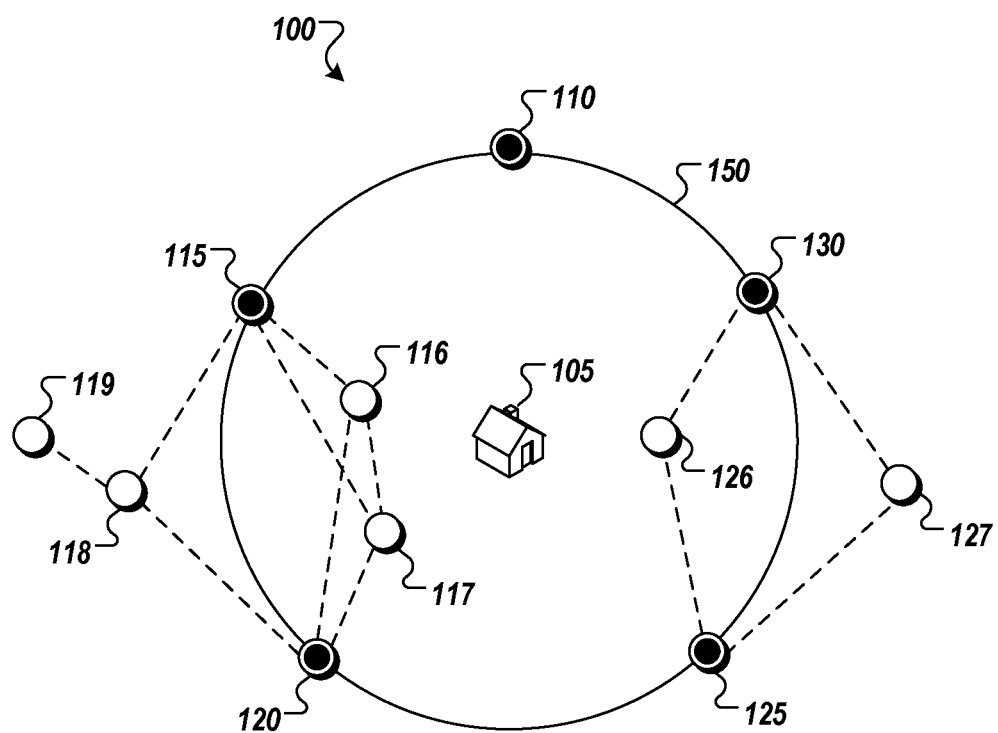
FIG. 1 illustrates an example image graph within which images of a point of interest may be browsed.

The subject technology is related to browsing images of a point of interest within an image graph (e.g., image graph 100 of FIG. 1). In one implementation, a server receives (e.g., from a client computing device) an indication of a selection of a point of interest (e.g., point of interest 105) from among a plurality of points of interest. For example, a user may request to view images of the Statue of Liberty. The server identifies an image graph associated with the selected point of interest. The image graph includes multiple images (e.g., images 110, 115, 116, 117, 118, 119, 120, 125, 126, 127, and 130) of the selected point of interest. A tour path (e.g., tour path 150) for the point of interest, including, for example, images (e.g., images 110, 115, 120, 125, and 130) of the selected point of interest from several different camera positions, is defined within the image graph. The server provides a specific image (e.g., image 115) from the tour path defined within the image graph for display. The server determines a previous image (e.g., image 110) and a next image (e.g., image 120) relative to the specific image (e.g., image 115) along the tour path (e.g., tour path 150) defined within the image graph.

The server also determines a first set of additional images (e.g., additional images 116, 117, and 118) from the image graph based on the specific image (e.g., image 115). The first set of additional images corresponds to a set of images in the image graph proximate to the specific image (i.e., images neighboring the specific image or sharing an edge with the specific image). The server also provides a link to the previous image (e.g., image 110) or the next image (e.g., image 120), and a link to each member of the first set of additional images (e.g., additional images 116, 117, and 118) for display with the specific image. The server may receive, from the user, a selection of a link to a selected member of the first set of additional images (e.g., a link to image 118). In response, the server may provide the selected member of the first set of additional images (e.g., image 118) for display. The server may also determine a second set of additional images (e.g., image 119) from the image graph based on the selected member of the first set (e.g., based on image 118). The second set of additional images may correspond to a set of images in the image graph proximate to the selected member (e.g., image 118) of the first set of additional images (e.g., images 116, 117, and 118). The server may also provide a link to each member of the second set of additional images (e.g., image 119) for display while providing at least one of a link to the specific image (e.g., image 115), the link to the previous image (e.g., image 110), or the link to the next image (e.g., image 120) for display.

Advantageously, in some implementations of the subject technology, images from multiple different imagery sets (e.g., street view panoramas, aerial images, satellite images, user images from a photograph sharing service, or images from videos) may be combined into an image tour that can be browsed by a user of a client computing device. For example, image 110 may be a street view panorama, image 115 may be a photograph from a photograph sharing service that is publicly available, image 120 may be an image from a video that is publicly available, etc. In addition, the user may depart from the image tour (e.g., path 150 including images 110, 115, 120, 125, and 130) to view images (e.g., image 118, as described above) in the image graph that are not on the image tour. While the user departs from the image tour to view other images, the client computing device may display one or more links (e.g., links to images 110, 115, or 120) to allow the user to easily return to the tour.

FIG. 1 illustrates an example image graph 100 within which images of a point of interest may be browsed. As illustrated, the image graph 100 includes images 110, 115, 116, 117, 118, 119, 120, 125, 126, 127, and 130 of a point of interest 105, represented by black dots and white dots. The image graph 100 also includes a tour path 150. The tour path 150 includes images 110, 115, 120, 125, and 130, represented by black dots. Additional images 116, 117, 118, 119, 126, and 127, represented by white dots, are not on the tour path 150 but may be viewed by a user of a client computing device (e.g., client computing device 230) if the user decides to leave the tour path 150.

Non-dotted lines/curves or dotted lines/curves (e.g., between image 110 and image 115 or between image 115 and image 116) may correspond to edges within the image graph 100. Non-dotted lines/curves (e.g., between image 110 and 115) may be included within the tour path 150. Dotted lines/curves (e.g., between image 115 and image 116) may not be included within the tour path 150.

At one point in time, an image (e.g., image 115) from the image graph 100 is displayed on a client computing device. At this point in time, the edges in the image graph 100 that include the image may correspond to links to other images that are provided for display on the client computing device in conjunction with the image. For example, when image 115 is displayed, links to images 110, 116, 117, 118, and 120 may be provided in conjunction with the display of image 115.

Figure 3:
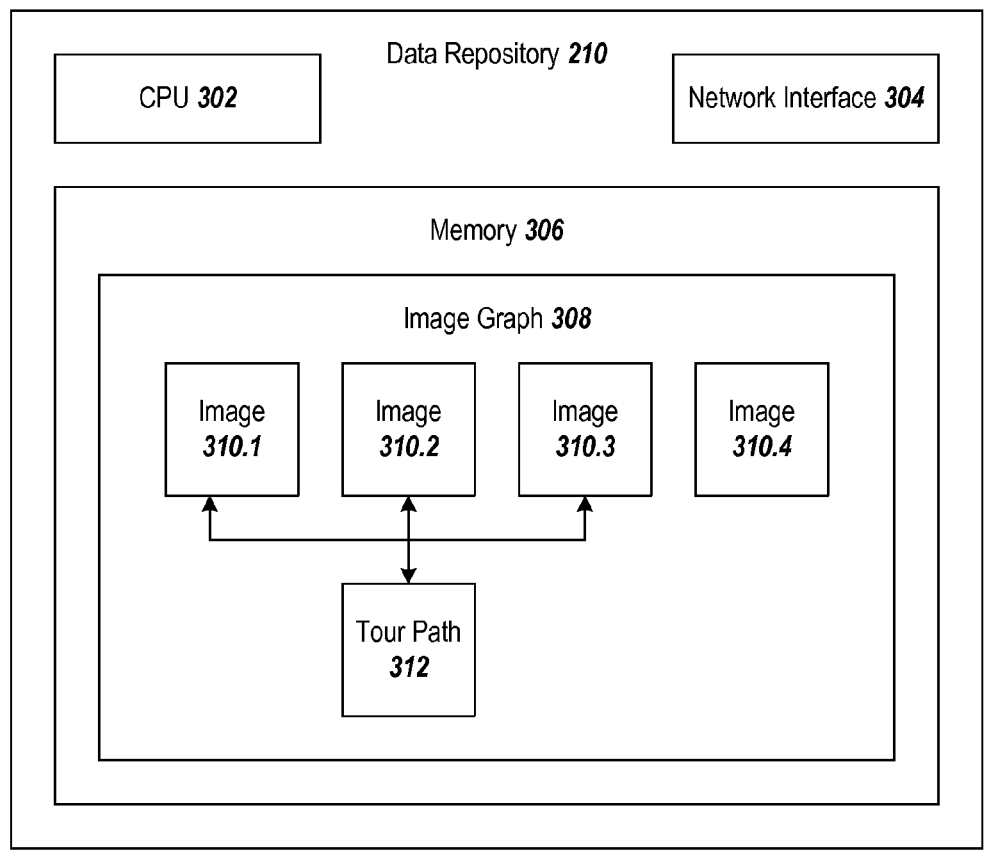
FIG. 3 illustrates an example of the data repository of FIG. 2 in more detail.

The image graph 100 corresponds to an image graph stored within a memory of one or more computing devices. For example, the image graph 100 may correspond to an image graph 308, which is stored within a memory 306 of a data repository 210, as shown in FIG. 3 and described in greater detail below.

As used herein, an image graph (e.g., image graph 100) may include a graph describing a relationship between a set of images (e.g., images 110, 115, 116, 117, 118, 119, 120, 125, 126, 127, and 130). The set of images may include photographs. Each node in the image graph may correspond to an image from the set of images. The edges in the image graph may encode connectivity. For example, an edge between image node 110 and image node 115 may indicate that image 110 and image 115 are related. For example, image 110 and image 115 may have similar viewpoints or different viewpoints of the same object(s) (e.g., point of interest 105).

Figure 2:
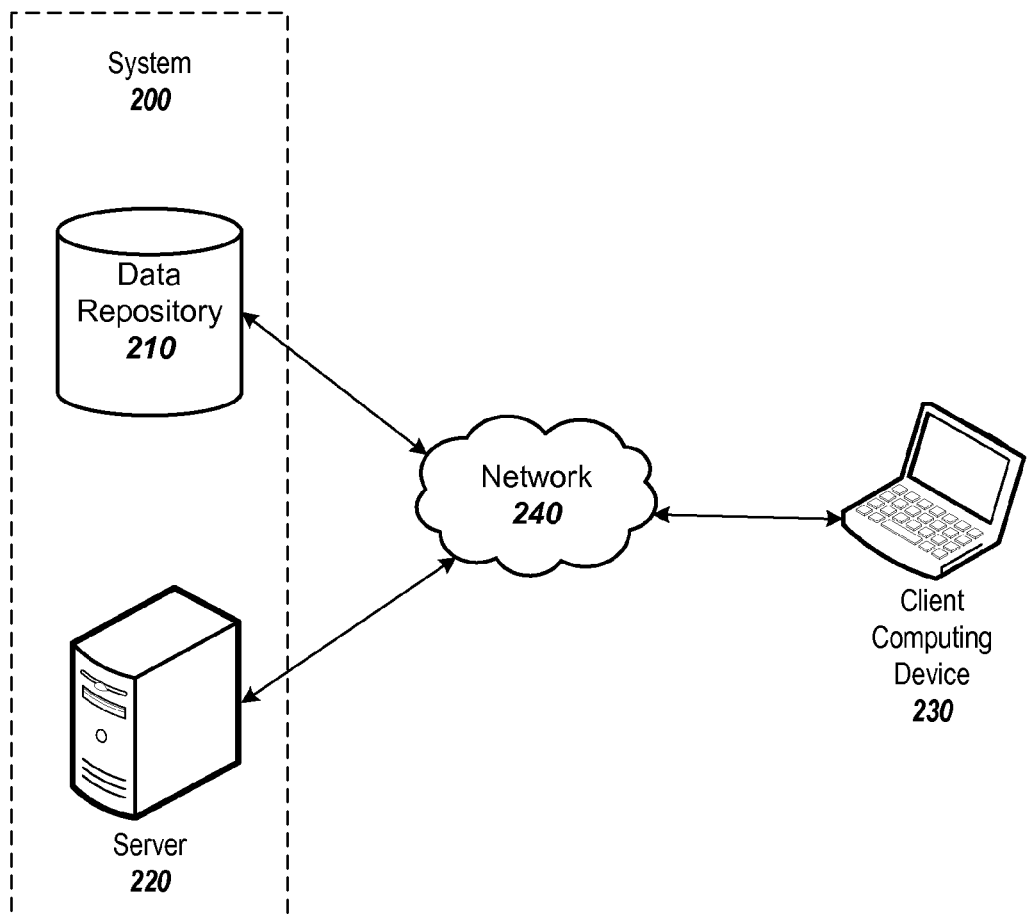
FIG. 2 illustrates an example of a system configured to browse images of a point of interest within an image graph.

FIG. 2 illustrates an example of a system 200 configured to browse images of a point of interest within an image graph. As shown, the system 200 includes a data repository 210 and a server 220. The data repository 210 and the server 220 may be configured to communicate with one another or with a client computing device 230 via a network 240. The network 240 may include the Internet, an intranet, a local area network, a wide area network, a wired network, a wireless network, or a virtual private network (VPN). While only one data repository 210, server 220, and client computing device 230 are illustrated, the subject technology may be implemented in conjunction with any number of data repositories 210, servers 220, or client computing devices 230. In some aspects, a single machine may implement the functions of two or more of the data repository 210, the server 220, or the client computing device 230.

The data repository 210 may store images of one or more points of interest. As described in greater detail below, the images may be stored within an image graph that includes a tour path. The data repository may include a single machine, multiple machines, a single processor system, or a multi-processor system. One example of the data repository 210 is described in more detail in conjunction with FIG. 3 below.

The server 220 may include a module to facilitate browsing images of a point of interest on a client computing device 230. The server 220 may be implemented as a single machine with a single processor, a multi-processor machine, or a server farm including multiple machines with multiple processors. One example of the server 220 is described in more detail in conjunction with FIG. 4 below.

The client computing device 230 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 230 may include one or more of a keyboard, a mouse, a display, or a touch screen. The client computing device 230 may also include a web browser configured to display webpages. The web browser may be configured to browse images of a point of interest within an image graph. Alternatively, the client computing device 230 may include an application (e.g., a mobile phone or tablet computer application) for browsing images of a point of interest within an image graph. While only one client computing device 230 is illustrated in FIG. 2, the subject technology may be implemented in conjunction with one or more client computing devices 230.

FIG. 3 illustrates an example of the data repository 210 in more detail. As shown, the data repository 210 includes a central processing unit (CPU) 302, a network interface 304, and a memory 306. The CPU 302 includes one or more processors that are configured to execute computer instructions that are stored in a computer-readable medium, for example, the memory 306. The network interface 304 is configured to allow the data repository 210 to transmit and receive data in a network, e.g., network 240 of FIG. 2. The network interface 304 may include one or more network interface cards (NICs). The memory 306 may store data or instructions. The memory 306 may include any computer-readable medium, for example, a cache unit, a storage unit, an internal memory unit, or an external memory unit, for example, a compact disk drive, a digital video disk drive, or a universal serial bus drive. As illustrated, the memory 306 includes a data structure representing an image graph 308.

The image graph 308 includes multiple images 310.1-4 and a tour path 312. The multiple images 310.1-4 may be images of a point of interest (e.g., the Statue of Liberty). The images 310 may be from one, two, or more than two imagery sets. The imagery sets may include, for example, street view panoramas, aerial images, satellite images, user images from a photograph sharing service that the public has permission to access, or images from videos. The images 310 may include images from the exterior of the point of interest. If the point of interest has an interior (e.g., the point of interest is a building, rather than a statue with no interior), the images 310 may also, with proper permission from an owner or an occupant of the point of interest, include interior views of the point of interest (e.g., views of the interior of the walls of the point of interest or views of furniture or structures within the interior of the point of interest). While four images 310 are illustrated in FIG. 3, the subject technology may be implemented in conjunction with any number of images 310. The tour path 312 may correspond to a path around the point of interest that features images of the point of interest from different camera positions. The tour path may include a subset of the images 310.1-4, e.g., images 310.1-3. The images 310.1-3 in the tour path 312 may be arranged according to a linear order (e.g., a linear image tour of the point of interest with a start position and an end position) or a circular order (e.g., a circular tour of the point of interest). A camera position may be a combination of a viewpoint position, a viewpoint orientation, and a field of view.

In one example, the image graph 308 is for a particular point of interest and includes a single tour path 312 for the point of interest and some additional images of the point of interest, where the additional images (e.g., image 310.4) are outside the tour path 312. In another example, the image graph may correspond to a geographic region (e.g., a city) and may include images of multiple points within the city and tour paths for multiple points of interest within the city. For example, an image graph for Washington, D.C., may include images 310 of different places in the city and tour paths 312 for one or more points of interest in the city, e.g., the White House, the Capitol Building, the Washington Monument, the Smithsonian Institution, and the Lincoln Memorial.

Figure 4:
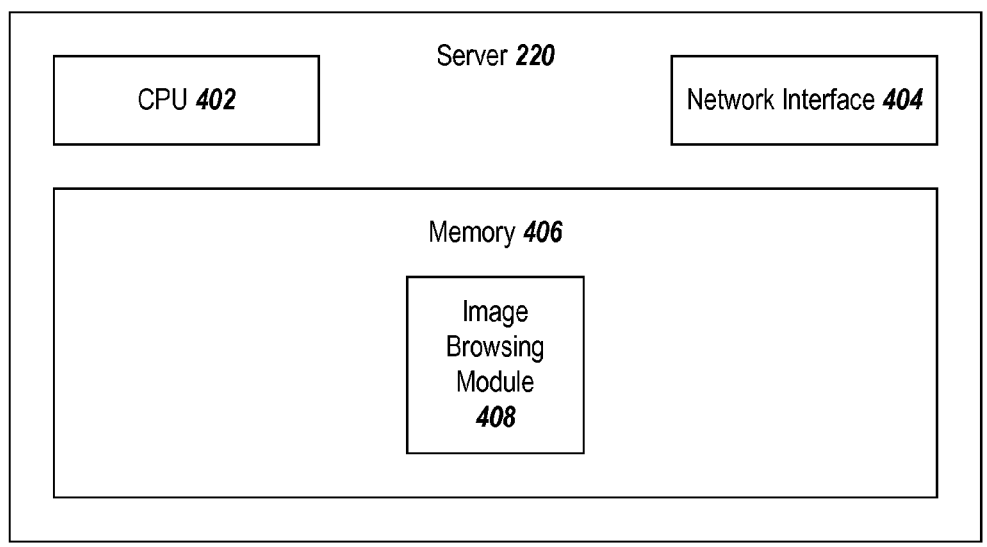
FIG. 4 illustrates an example of the server of FIG. 2 in more detail.

FIG. 4 illustrates an example of the server 220 in more detail. As shown, the server 220 includes a central processing unit (CPU) 402, a network interface 404, and a memory 406. The CPU 402 includes one or more processors that are configured to execute computer instructions that are stored in a computer-readable medium, for example, the memory 406. Furthermore, while the server 220 is illustrated as a single machine, the server 220 may include multiple machines, e.g., within a server farm. The network interface 404 is configured to allow the server 220 to transmit and receive data in a network, e.g., network 240 of FIG. 2. The network interface 404 may include one or more network interface cards (NICs). The memory 406 may store data or instructions. The memory 406 may include any computer-readable medium, for example, a cache unit, a storage unit, an internal memory unit, or an external memory unit, for example, a compact disk drive, a digital video disk drive, or a universal serial bus drive. As illustrated, the memory 406 includes an image browsing module 408.

The image browsing module 408 may include instructions which, when implemented by one or more processors in the CPU 402, cause the one or more processors in the CPU 402 to implement a process (e.g., process 500) for browsing images of points of interest. The image browsing module 408 includes code to receive (e.g., from a client computing device 230) a selection of a point of interest from among multiple points of interest. The image browsing module 408 also includes code to identify a tour path (e.g., tour path 150) associated with the selected point of interest. The tour path includes multiple images of the selected point of interest (e.g., images 110, 115, 120, 125, and 130) arranged according to an order. The tour path may be defined within an image graph (e.g., image graph 100). The image graph may include images within the tour path. The image browsing module 408 also includes code for providing a specific image (e.g., image 115) from the tour path defined within the image graph for display via the client computing device. The image browsing module 408 also includes code for determining a previous image (e.g., image 110) and a next image (e.g., image 120) relative to the specific image (e.g., image 115) along the tour path (e.g., tour path 150). The image browsing module 408 also includes code for determining a set of additional images (e.g., images 116, 117, and 118) based on the specific image. The image graph (e.g., image graph 100) may include images within the set of additional images. The set of additional images includes one or more images not included in the tour path. The image browsing module also includes code for providing a link to the previous image or the next image and a link to each member of the set of additional images for display with the specific image.

Figure 5A:
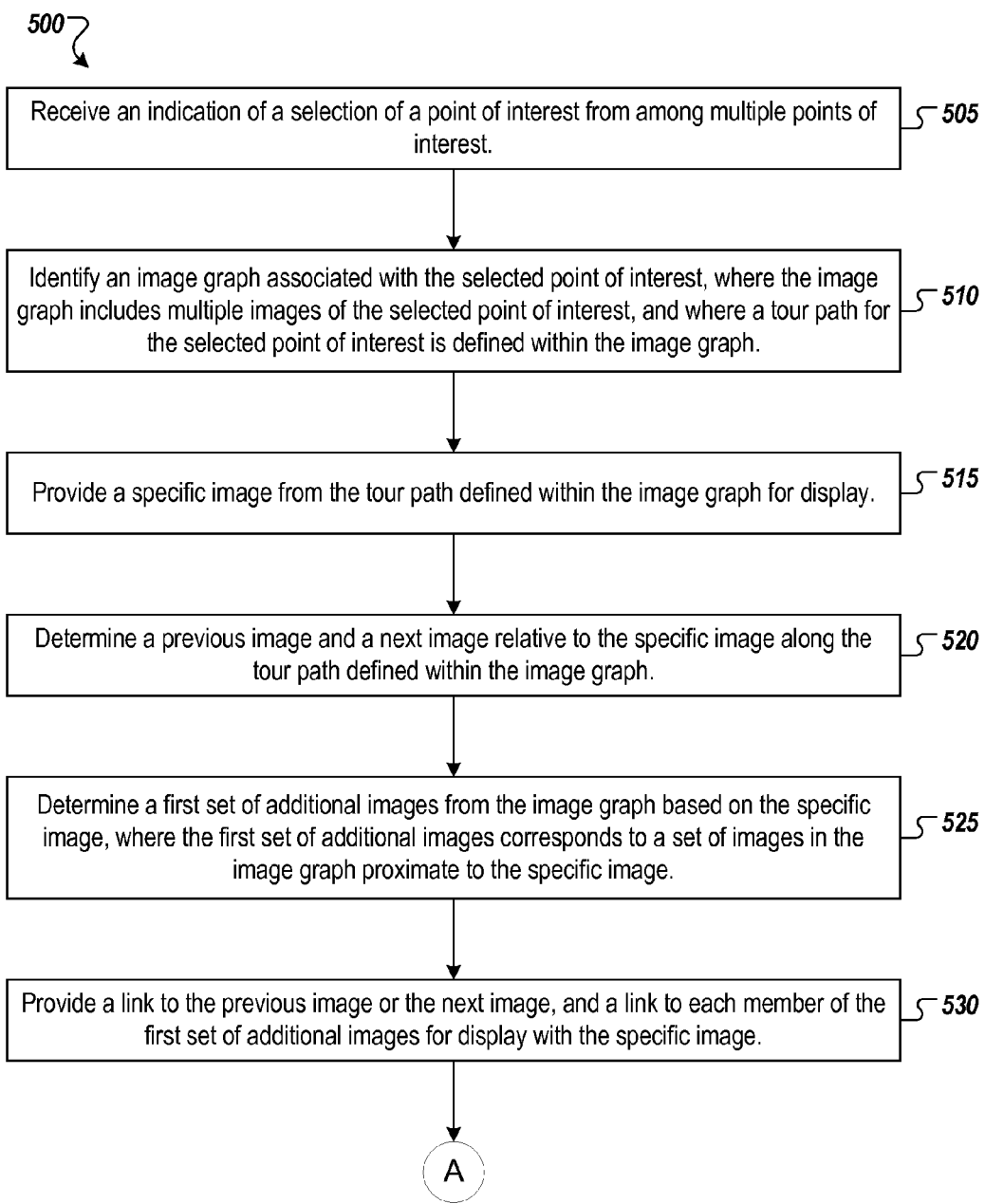
FIGS. 5A-5B illustrates an example process by which images of a point of interest within an image graph may be browsed.
Figure 5B:
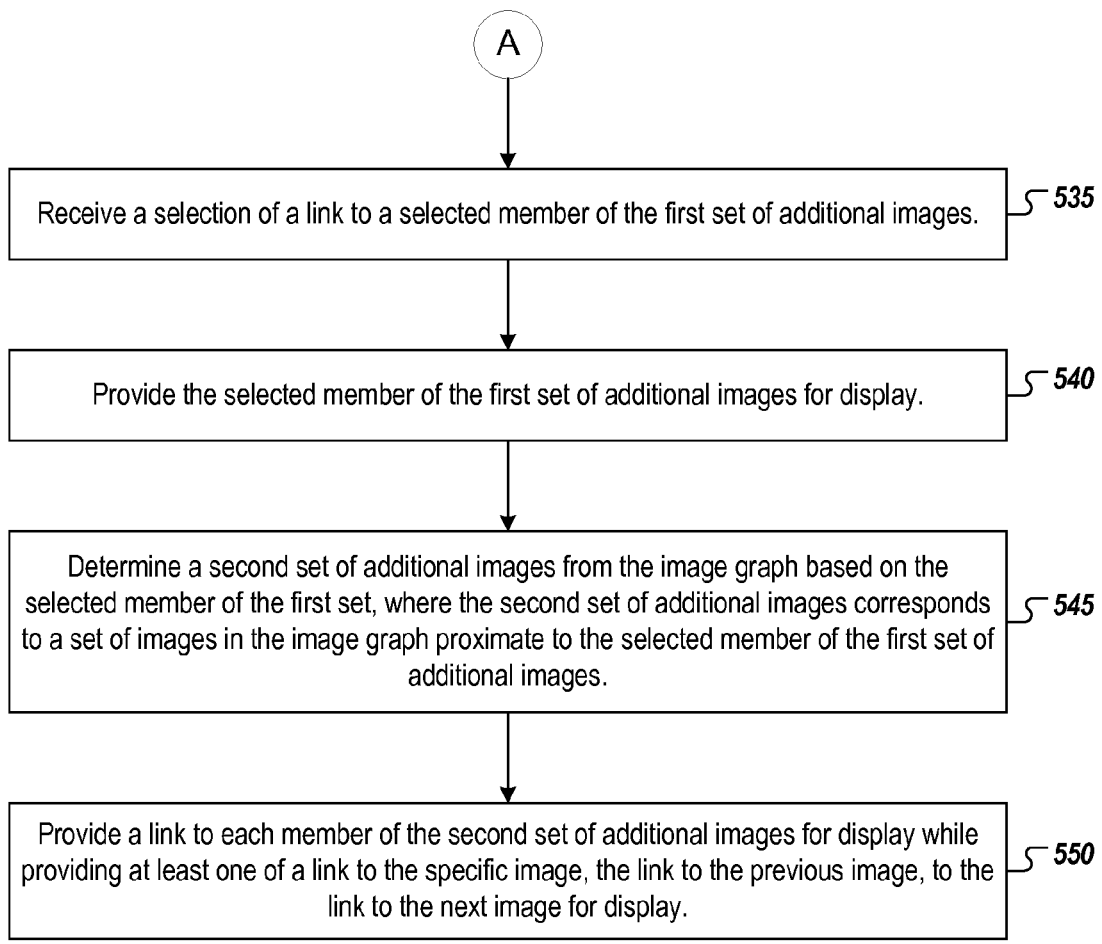

FIGS. 5A-5B illustrates an example process 500 by which images of a point of interest within an image graph may be browsed. The process 500 begins at step 505, where a server (e.g., server 220) receives (e.g., from a client computing device 230) an indication of a selection of a point of interest from among multiple point of interest. For example, a user of client computing device may select the Louvre Museum from among multiple points of interest in Paris (e.g., the Louvre Museum, the Arc de Triumph, and the Eiffel Tower) or from among multiple points of interest throughout the world. The user may make the selection via a map displayed on a client computing device, e.g., by selecting a point or region on the map corresponding to the Louvre Museum. Alternatively, the user may select the Louvre Museum from a hub image that includes two or more points of interest. For example, the server may provide the hub image including the two or more points of interest from among the multiple points of interest (e.g., a street view panorama including the Louvre Museum and the Hotel de la Place du Louvre) and receive an indication of a selection of the point of interest from the two or more points of interest within the hub image. In one example, the user may select the Louvre Museum, rather than the Hotel de la Place du Louvre by touching the portion of the image corresponding to the Louvre Museum on a touch screen or clicking on the Louvre Museum using a mouse.

In step 510, the server identifies an image graph (e.g., image graph 100) associated with the selected point of interest. The image graph includes multiple images of the selected point of interest (e.g., images 110, 115, 116, 117, 118, 119, 120, 125, 126, 127, and 130). A tour path (e.g., tour path 150) for the selected point of interest is defined within the image graph.

In step 515, the server provides a specific image (e.g., image 115) from the tour path defined within the image graph for display. In step 520, the server determines a previous image (e.g., image 110) and a next image (e.g., image 120) relative to the specific image along the tour path defined within the image graph.

In step 525, the server determines a first set of additional images (e.g., images 116, 117, and 118) from the image graph based on the specific image. The first set of additional images corresponds to a set of images in the image graph proximate to the specific image. For example, the image graph may include edges from the specific image to the member(s) of the first set of additional images. The first set of additional images may include images outside of the tour path. So as not to confuse the user, the first set of additional images may include at most a threshold number of images (e.g., at most four images). As used herein, an image j in an image graph may be proximate to an image k in the image graph if image j is a neighbor of image k in the image graph, i.e., if image j shares an edge with image k. For example, as illustrated in FIG. 1, image 110 is proximate to image 115 because image 110 and image 115 share an edge. However, image 110 is not proximate to image 120 because image 110 and image 120 do not share an edge.

In step 530, the server provides a link to the previous image or the next image, and a link to each member of the first set of additional images for display with the specific image. The link to one member of the first set of additional images may be a click target on the specific image. The click target on the specific image may be a region on the image associated with the one member. For example, the specific image may be a street view panorama of a cathedral point of interest and the one member of the first set of additional images may be a more detailed user photograph of the cross of the cathedral. A region on the specific image proximate to the cross may include a click target for viewing the one member of the first set of additional images. Alternatively, the link to the one member of the first set of additional images may be a thumbnail version of the one member of the first set of additional images presented adjacent to the specific image. As used herein, the term "thumbnail" encompasses its plain and ordinary meaning including, but not limited to, a reduced-size version of an image. In yet another alternative, the link to one member of the first set of additional images may be a hyperlink including text. In some example aspects, two or more of the alternatives above may be used (e.g., a link to a first image in the first set of additional images may be a click target and a link to a second image in the first set of additional images may be a thumbnail).

With reference to FIG. 5B, in step 535, the server receives a selection of a link to a selected member (e.g., image 118) of the first set of additional images. The selected member may be connected to the specific image (e.g., image 115) via an edge in the image graph. In step 540, the server provides the selected member of the first set of additional images for display.

In step 545, the server determines a second set of additional images (e.g., the second set may include image 119) from the image graph based on the selected member of the first set (e.g., image 118). The second set of additional images may correspond to a set of images in the image graph proximate to the selected member of the first set of additional images (e.g., image 118). The second set of additional images may include images of the selected point of interest that are not on the tour path (e.g., tour path 150) for the selected point of interest.

In step 550, the server provides a link to each member of the second set of additional images for display while providing at least one of a link to the specific image (e.g., image 115) on the tour path, a link to the previous image (e.g., image 110) on the tour path, or a link to the next image (e.g., image 120) on the tour path for display, so that the user could easily return to the tour path when he/she is finished viewing the image(s) that are not on the tour path.

In one example, the server may also receive a selection of a link to a selected member of the second set of additional images. The server may also provide the selected member of the second set of additional images for display. The server may also determine a third set of additional images form the graph based on the selected member of the second set. The third set of additional images may correspond to a set of images in the image graph proximate (e.g., linked by a single edge) to the selected member of the second set of additional images. The server may also provide a link to each member of the third set of additional images for display while providing at least one of a link to the specific image on the tour path, a link to the previous image on the tour path, or a link to the next image on the tour path for display, so that the user could easily return to the tour path when he/she is finished viewing the image(s) that are not on the tour path. After step 550, the process 500 ends.

In one implementation, instructions for implementing the steps 505-550 in the process 500 may be stored in a memory of a computer and may be implemented by one or more computers. The steps 505-550 in the process 500 may be carried out in series. Alternatively, two or more of the steps 505-550 in the process 500 may be carried out in parallel.

Figure 6A:
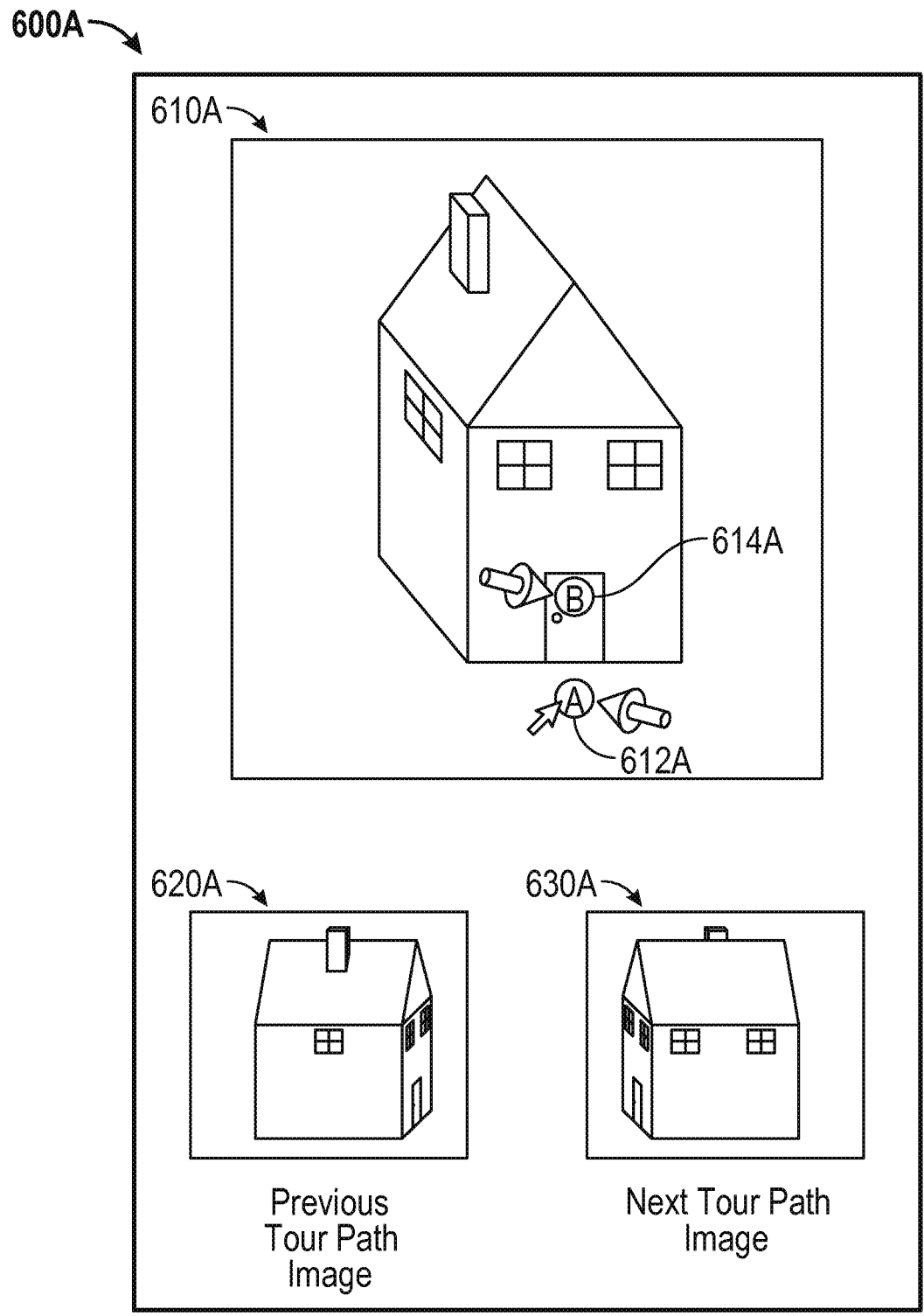
FIGS. 6A-6B illustrate example screenshots including images of a point of interest which may be browsed.
Figure 6B:
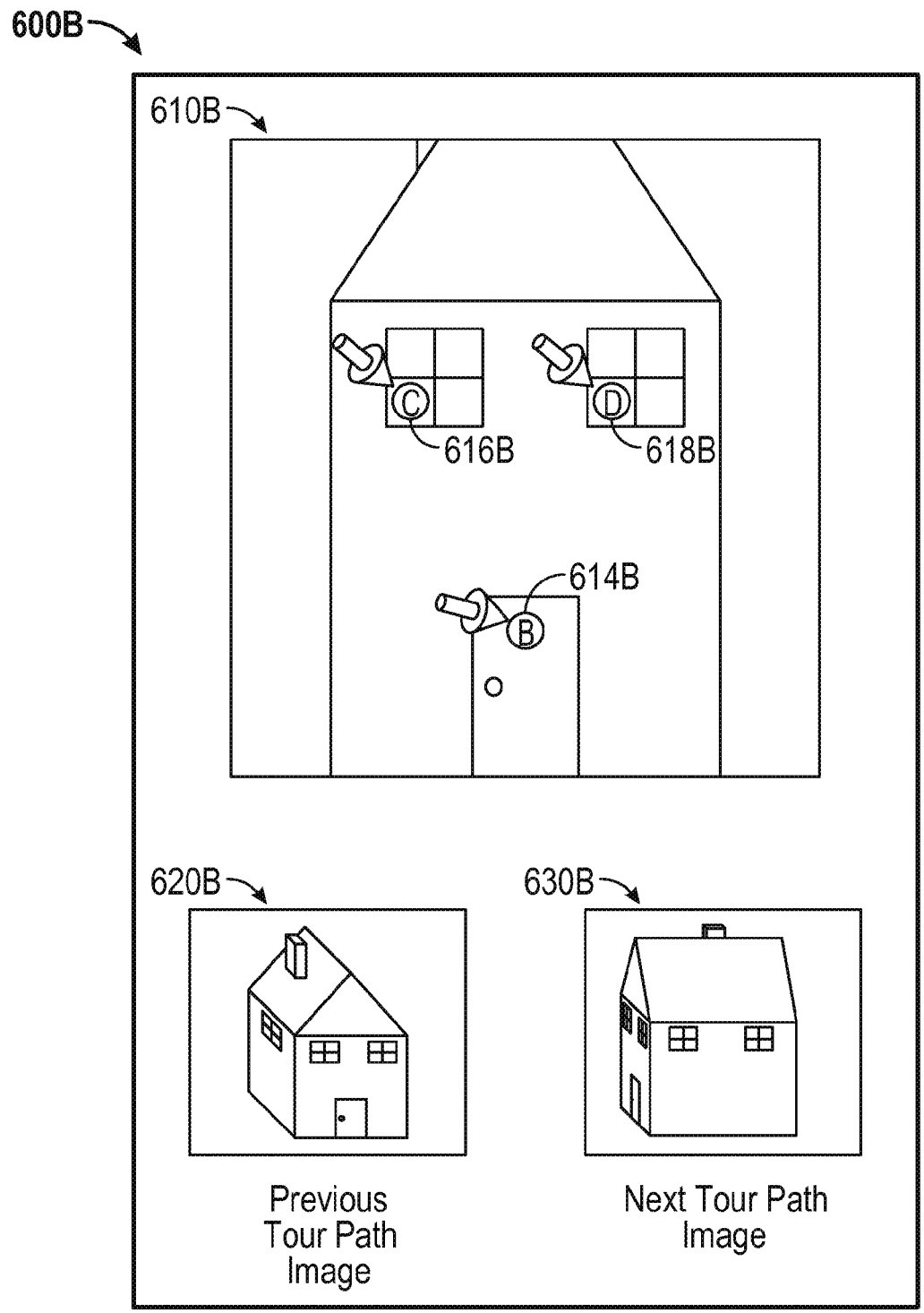

FIGS. 6A-6B illustrate example screenshots 600A and 600B including images of a point of interest which may be browsed. As shown, the screenshot 600A of FIG. 6A includes an image 610A on a tour path (e.g., tour path 150) in an image graph (e.g., image graph 100). The image 610A includes a view of a point of interest (a house, e.g., a cabin that is presently uninhabited and open to the public, or a model house of a real estate developer who is selling houses in a subdivision). The screenshot 600A also includes thumbnails 620A and 630A corresponding to a previous image and a next image of the point of interest, respectively.

The image 610A includes click targets 612A and 614A, indicated by three-dimensional arrows. The click targets 612A and 614A may correspond to additional images in the image graph that are not on the tour path. Click target 612A corresponds to a more detailed view of the front wall of the house. Click target 614A corresponds to an interior view of the house. The house may be unoccupied and open to the public. Alternatively, an owner or occupant of the house may have provided proper permissions for the server or the data repository to store image(s) of the interior of the house and to provide the stored image(s) to users of client computing devices. As illustrated, the user has selected click target 612A using a cursor. In response to the user's selection of the click target 612A, the screenshot 600B of FIG. 6B may be provided for display.

As shown, the screenshot 600B includes an image 610B of the point of interest corresponding to the selected click target 612A. The image 610B corresponds to a more detailed view of the front wall of the house in image 610A. The image 610B corresponds to an image in the image graph (e.g., image graph 100) that is not on the tour path (e.g., tour path 150).

The screenshot 600B also includes thumbnails 620B and 630B. The thumbnails 620B ad 630B correspond to images on the tour path. As would be apparent, image 620B corresponds to image 610A on the tour path and image 630B corresponds to image 630A on the tour path. As a result, the user may easily return to the tour path using the thumbnails 620B or 630B after he/she is finished viewing the images not on the tour path (e.g., image 610B).

The image 610B also includes click targets 614B, 616B, and 618B, indicated by three-dimensional arrows. The click targets 614B, 616B, and 618B correspond to additional images of the house point of interest that are not on the tour path. Click target 614B corresponds to an interior view of the house. Click target 616B corresponds to a more detailed view of the left window of the house. Click target 618B corresponds to a more detailed view of the right window of the house. The server or the data repository have proper permissions from the owner or occupant of the house to store images of the interior of the house and the window of the house. If the owner or occupant of the house denies permission to the server or the data repository to store such images, the images may be deleted from the server or the data repository or no longer provided to users of client computing devices.

As illustrated in FIGS. 6A-6B, links to images on the tour path are presented as thumbnails 620A, 630A, 620B, and 630B, while links to images not on the tour path are presented as click targets 612A, 614A, 614B, 616B, and 618B within the primary displayed images 610A and 610B. However, links to images on the tour path and links to images not on the tour path may also be presented using other techniques (e.g., as text hyperlinks).

Figure 7:
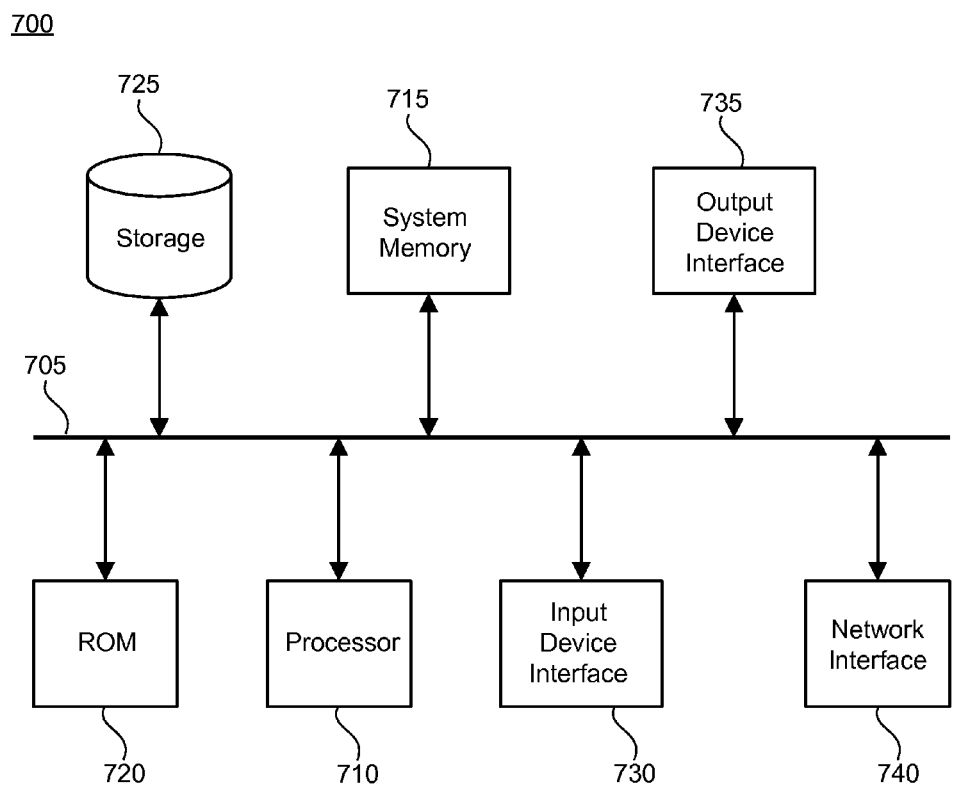
FIG. 7 conceptually illustrates an example electronic system with which some implementations of the subject technology are implemented.

FIG. 7 conceptually illustrates an electronic system 700 with which some implementations of the subject technology are implemented. For example, one or more of the data repository 210, the server 220, or the client computing device 230 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for browsing images of a point of interest within an image graph in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display of images generated by the electronic system 700. Output devices used with output device interface 735 include, for example, printers and display devices, for example cathode ray tubes (CRT) or liquid crystal displays (LCD). Some implementations include devices for example a touchscreen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for browsing images of points of interest, the method comprising:
   receiving an indication of a selection of a point of interest from among a plurality of points of interest;
   identifying an image graph associated with the selected point of interest, wherein the image graph comprises a plurality of images of the selected point of interest, and wherein a tour path for the selected point of interest is defined within the image graph, the tour path comprising a first set of images within the plurality of images arranged in a predetermined order;
   providing a specific image from the tour path defined within the image graph for display;
   determining a previous image and a next image relative to the specific image along the tour path defined within the image graph;
   determining a second set of additional images not in the tour path from the image graph based on the specific image, wherein the second set of additional images corresponds to a set of images in the image graph proximate to the specific image; and
   providing a link to the previous image or the next image along the tour path, and a link to each member of the second set of additional images for display with the specific image.

2. The method of claim 1, further comprising:
   receiving a selection of a link to a selected member of the second set of additional images; and
   providing the selected member of the second set of additional images for display.

3. The method of claim 2, further comprising:
   determining a third set of additional images from the image graph based on the selected member of the second set, wherein the third set of additional images corresponds to a set of images in the image graph proximate to the selected member of the second set of additional images; and
   providing a link to each member of the third set of additional images for display while providing at least one of a link to the specific image, the link to the previous image, or the link to the next image for display.

4. The method of claim 3, further comprising:
   receiving a selection of a link to a selected member of the third set of additional images;
   providing the selected member of the third set of additional images for display;
   determining a third set of additional images from the image graph based on the selected member of the third set, wherein the third set of additional images corresponds to a set of images in the image graph proximate to the selected member of the third set of additional images; and
   providing a link to each member of the third set of additional images for display while providing at least one of a link to the specific image, the link to the previous image, or the link to the next image for display.

5. The method of claim 1, wherein the image graph comprises images from a plurality of different imagery sets.

6. The method of claim 5, wherein the plurality of different imagery sets comprise two or more of:
   street view panoramas, aerial images, satellite images, user images from a photograph sharing service, or images from videos.

7. The method of claim 1, wherein the second set of additional images comprises images outside of the tour path.

8. The method of claim 1, wherein the second set of additional images comprises at most a threshold number of images.

9. The method of claim 1, wherein the link to one member of the second set of additional images comprises a click target on the specific image.

10. The method of claim 1, wherein the link to one member of the second set of additional images comprises a thumbnail version of the one member of the second set of additional images.

11. The method of claim 1, wherein the link to one member of the second set of additional images comprises a hyperlink including text.

12. The method of claim 1, wherein receiving the indication of the selection of the point of interest comprises:
   providing a hub image comprising two or more points of interest from among the plurality of points of interest for display; and receiving an indication of a selection of the point of interest from the two or more points of interest via the hub image.

13. A non-transitory computer-readable medium for browsing images of a point of interest selected by a user, the non-transitory computer-readable medium comprising instructions which, when executed by one or more computers, cause the one or more computers to:
    identify an image graph associated with the selected point of interest, wherein the image graph comprises a plurality of images of the selected point of interest, and wherein a tour path for the selected point of interest is defined within the image graph, the tour path comprising a first set of images within the plurality of images arranged in a predetermined order;
    provide a specific image from the tour path defined within the image graph for display;
    determine a previous image and a next image relative to the specific image along the tour path defined within the image graph;
    determine a second set of additional images not in the tour path from the image graph based on the specific image, wherein the second set of additional images corresponds to a set of images in the image graph proximate to the specific image; and
    provide a link to the previous image or the next image along the tour path, and a link to each member of the second set of additional images for display with the specific image.

14. The non-transitory computer-readable medium of claim 13, further comprising instructions which, when executed by the one or more computers, cause the one or more computers to:
    receive a selection of a link to a selected member of the second set of additional images; and
    provide the selected member of the second set of additional images for display.

15. The non-transitory computer-readable medium of claim 14, further comprising instructions which, when executed by the one or more computers, cause the one or more computers to:
    determine a third set of additional images from the image graph based on the selected member of the second set, wherein the third set of additional images corresponds to a set of images in the image graph proximate to the selected member of the second set of additional images; and
    provide a link to each member of the third set of additional images for display while providing at least one of a link to the specific image, the link to the previous image, or the link to the next image for display.

16. The non-transitory computer-readable medium of claim 13, wherein the image graph comprises images from a plurality of different imagery sets.

17. The non-transitory computer-readable medium of claim 16, wherein the plurality of different imagery sets comprise two or more of: street view panoramas, aerial images, satellite images, user images from a photograph sharing service, or images from videos.

18. A system for browsing images of points of interest, the system comprising:
    one or more processors;
    a memory comprising instructions which, when executed by the one or more processors, cause the one or more processors to:
        receive an indication of a selection of a point of interest from among a plurality of points of interest;
        identify a tour path associated with the selected point of interest, wherein the tour path comprises a plurality of images of the selected point of interest arranged according to a predetermined order;
        provide a specific image from the tour path defined within the image graph for display;
        determine a previous image and a next image relative to the specific image along the tour path;
        determine a set of additional images based on the specific image, wherein the set of additional images comprises one or more images not included in the tour path; and
        provide a link to the previous image or the next image along the tour path, and a link to each member of the set of additional images for display with the specific image.

19. The system of claim 18, wherein the tour path is defined within an image graph, and wherein the image graph comprises images within the tour path and images within the set of additional images.

20. The system of claim 18, wherein the instructions to receive the indication of the selection of the point of interest comprise instructions which, when executed by the one or more processors, cause the one or more processors to:
    receive, via a map, the indication of the selection of the point of interest.

* * * * *